United States Patent
Saito et al.

(10) Patent No.: US 10,449,833 B2
(45) Date of Patent: Oct. 22, 2019

(54) HEAT EXCHANGER AND HEAT PUMP SYSTEM

(71) Applicant: MITSUBISHI HEAVY INDUSTRIES THERMAL SYSTEMS, LTD., Minato-ku, Tokyo (JP)

(72) Inventors: Katsuhiro Saito, Tokyo (JP); Tomoki Hase, Tokyo (JP); Nobuya Nakagawa, Aichi (JP); Koji Nakado, Aichi (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 0 days.

(21) Appl. No.: 15/739,501

(22) PCT Filed: Jun. 23, 2016

(86) PCT No.: PCT/JP2016/068695
§ 371 (c)(1),
(2) Date: Dec. 22, 2017

(87) PCT Pub. No.: WO2017/029882
PCT Pub. Date: Feb. 23, 2017

(65) Prior Publication Data
US 2018/0178632 A1 Jun. 28, 2018

(30) Foreign Application Priority Data
Aug. 19, 2015 (JP) .................. 2015-161905

(51) Int. Cl.
*F25B 39/00* (2006.01)
*B60H 1/32* (2006.01)
(Continued)

(52) U.S. Cl.
CPC ....... *B60H 1/3227* (2013.01); *B60H 1/00321* (2013.01); *B60H 1/00328* (2013.01);
(Continued)

(58) Field of Classification Search
CPC .............. B60H 1/3227; B60H 1/00907; B60H 1/00321; F28F 9/0202; F28F 9/0246;
(Continued)

(56) References Cited

U.S. PATENT DOCUMENTS

2013/0220584 A1* 8/2013 Mishiro .................. F25B 39/00
165/143
2014/0373562 A1* 12/2014 Suzuki ...................... F25B 5/00
62/159
(Continued)

FOREIGN PATENT DOCUMENTS

JP 9-145186 A 6/1997
JP 10-238895 A 9/1998
(Continued)

OTHER PUBLICATIONS

International Search Report dated Sep. 6, 2016 for International Patent Application No. PCT/JP2016/068695 with English Translation.
(Continued)

*Primary Examiner* — Joseph F Trpisovsky
(74) *Attorney, Agent, or Firm* — Birch, Stewart, Kolasch & Birch, LLP

(57) ABSTRACT

A heat exchanger and a heat pump system capable of reducing the amount of a refrigerant that accumulates in an outdoor heat exchanger during heating operation, and of decreasing the appropriate amount of refrigerant during heating operation. A vehicle-external heat exchanger is provided with a hollow first header, a hollow second header provided facing the first header, and a plurality of tubes provided between and communicating with the first header and the second header. The first header is provided with a partition plate that divides the interior of the first header. A first opening formed on a partition plate side between the upper end of the first header and the partition plate. When
(Continued)

functioning as an evaporator, the refrigerant is supplied from the lower part of the first header or of the second header, and the first opening serves an outflow port for the refrigerant.

3 Claims, 4 Drawing Sheets

(51) Int. Cl.
*F25B 39/02* (2006.01)
*F25B 39/04* (2006.01)
*F25B 43/00* (2006.01)
*F28F 9/02* (2006.01)
*F28D 1/053* (2006.01)
*B60H 1/00* (2006.01)
*F28D 21/00* (2006.01)

(52) U.S. Cl.
CPC ....... *B60H 1/00907* (2013.01); *B60H 1/3213* (2013.01); *F25B 39/00* (2013.01); *F25B 39/02* (2013.01); *F25B 39/04* (2013.01); *F25B 43/00* (2013.01); *F28D 1/05375* (2013.01); *F28F 9/0202* (2013.01); *F28F 9/0209* (2013.01); *B60H 2001/00928* (2013.01); *F28D 2021/0084* (2013.01); *F28D 2021/0085* (2013.01)

(58) Field of Classification Search
CPC ........ F28F 9/0253; F28F 9/028; F28F 9/0273; F25B 39/00; F28D 1/05375; F28D 2021/0084; F28D 2021/0085
USPC .................................................. 62/525, 239
See application file for complete search history.

(56) References Cited

U.S. PATENT DOCUMENTS

2015/0143835 A1  5/2015  Matsumoto
2017/0320378 A1  11/2017  Nakagawa et al.

FOREIGN PATENT DOCUMENTS

| JP | 2001-116381 A | 4/2001 |
| JP | 2011-102650 A | 5/2011 |
| JP | 2013-231573 A | 11/2013 |
| JP | 2014-88060 A | 5/2014 |
| JP | 2016-9787 A | 5/2016 |

OTHER PUBLICATIONS

Written Opinion dated Sep. 6, 2016 for International Patent Application No. PCT/JP2016/068695 with English Translation.

* cited by examiner

HEAT EXCHANGER AND HEAT PUMP SYSTEM

TECHNICAL FIELD

The present invention relates to a heat exchanger and a heat pump system.

BACKGROUND ART

Vehicular air conditioning systems used in electric vehicles (EV), hybrid electric vehicles (HEV, PHEV), and the like do not perform heating operation utilizing combustion exhaust heat of engine cooling fluid or the like. A solution being considered for this situation is a heat pump type air conditioning system using an electric compressor.

Patent Document 1 listed below discloses a configuration separately provided with an evaporator outside the vehicle cabin and a condenser outside the vehicle cabin. Normally, the evaporator outside the vehicle cabin is connected with the refrigeration cycle for heating operation, and the condenser outside the vehicle cabin is connected with the refrigeration cycle for cooling operation.

CITATION LIST

Patent Document

Patent Document 1: JP 2014-88060 A
Patent Document 2: JP 2013-231573 A

SUMMARY OF INVENTION

Technical Problems

If an outdoor heat exchanger has both an evaporator function and a condenser function and functions as an evaporator during heating operation and as a condenser during cooling operation, which is different from the technology disclosed in Patent Document 1, the configuration of a heat pump system can be simplified.

Patent Document 2 listed above discloses a technology relating to an outdoor heat exchanger applied to a heat pump system and having both an evaporator function and a condenser function. Unfortunately, the outdoor heat exchanger disclosed in Patent Document 2 has a complex way of flowing a refrigerant and requires piping to be connected to the outdoor heat exchanger and an additional valve.

The inventors have found that in a heat pump system using an outdoor heat exchanger having both an evaporator function and a condenser function, the appropriate amount of a refrigerant is different between during heating operation and during cooling operation, and the appropriate amount of the refrigerant during heating operation is greater than that during cooling operation.

In heat pump systems of the related art, the appropriate amount of a refrigerant and the capacity of a receiver are selected on the basis of evaluation at the time of maximum cooling. If a heat pump system using an outdoor heat exchanger having both an evaporator function and a condenser function is applied, the appropriate amount of a refrigerant during heating operation is required to be considered. Thus, the capacity of a receiver functioning as a buffer for the amount of the refrigerant is enlarged in comparison with heat pump systems in the related art. Unfortunately, problems arise in that the capacity of the overall heat pump system is increased and the enlarged capacity of the receiver increases cost.

The refrigerant is accumulated in a component other than the receiver during heating operation. To reduce a difference in the appropriate amount of the refrigerant between during heating operation and during cooling operation, the amount of the accumulated refrigerant is required to be reduced.

In the light of the foregoing, an object of the present invention is to provide a heat exchanger and a heat pump system capable of reducing the amount of a refrigerant that is accumulated in an outdoor heat exchanger during heating operation and of decreasing the appropriate amount of the refrigerant during heating operation.

Solution to Problems

A heat exchanger according to a first aspect of the present invention includes: a hollow first header; a hollow second header provided facing the first header; and a plurality of tubes disposed between the first header and the second header and communicating with the first header and the second header, the first header being provided with a partition plate dividing an interior of the first header, the first header being provided with a first opening on a partition plate side between an upper end of the first header and the partition plate, and with the heat exchanger functioning as an evaporator, a refrigerant being supplied from a lower part of the first header or of the second header, and the first opening serving as an outflow port for the refrigerant.

This configuration allows the refrigerant to flow in the first header, the tubes, and the second header. With the heat exchanger functioning as an evaporator, the refrigerant is supplied from the lower part of the first header or of the second header, and then flows out from the first opening formed on the partition plate side between the upper end of the first header and the partition plate. Since the first opening is formed on the partition plate side, the liquefied refrigerant can flow out through the first opening at the height of the first opening without accumulating up to the upper end of the first header. Thus, the amount of the liquid refrigerant accumulating in the first header can be reduced.

In the first aspect of the present invention, the first header is provided with a second opening formed on an upper end side of the first header with respect to the first opening; and with the heat exchanger functioning as a condenser, the refrigerant is supplied from the second opening and flows to the lower part of the first header or of the second header.

According to this configuration with the heat exchanger functioning as a condenser, the refrigerant is supplied from the second opening and flows to the lower part of the first header or of the second header. The second opening is formed on the upper end side of the first header with respect to the first opening. Thus, even if the refrigerant is liquefied in the vicinity of the second opening or in piping connected with the second opening, with the heat exchanger functioning as an evaporator, the refrigerant can be discharged from the first opening.

A heat pump system according to a second aspect of the present invention includes: the above-described heat exchanger; a first circuit connected with the heat exchanger, a refrigerant flowing through the first circuit with the heat exchanger functioning as an evaporator; and a second circuit connected with the heat exchanger, the refrigerant flowing through the second circuit with the heat exchanger functioning as a condenser.

In the second aspect of the present invention, the heat pump system includes: the heat exchanger; the first circuit;

and the second circuit; and the heat pump system is applied as a vehicular air conditioning system.

Advantageous Effects of Invention

According to the aspects of the present invention, the amount of a refrigerant that accumulates in an outdoor heat exchanger during heating operation can be reduced, and the appropriate amount of the refrigerant during heating operation can be decreased.

DESCRIPTION OF EMBODIMENTS

A heat pump type vehicular air conditioning system 1 and a vehicle-external heat exchanger 11 according to an embodiment of the present invention will be described below with reference to the drawings.

Figure 1:
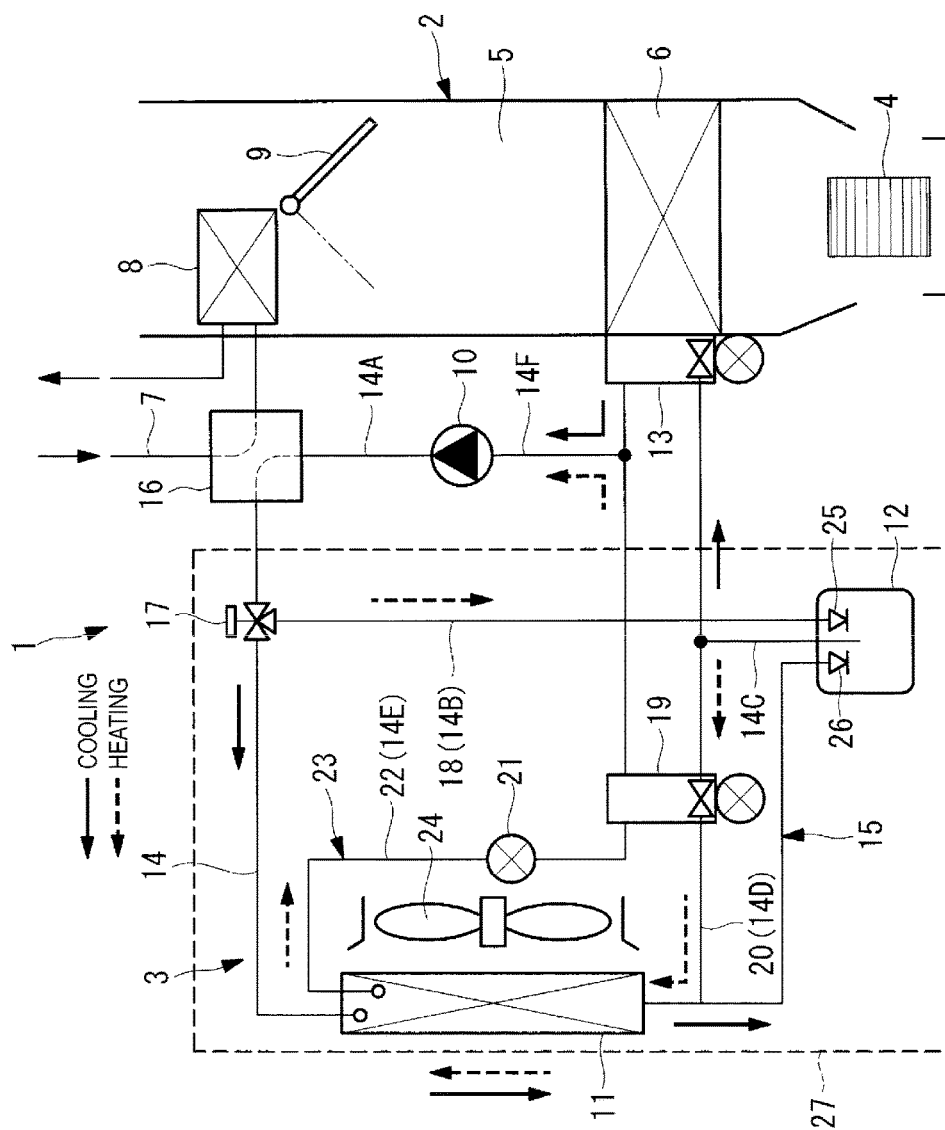
FIG. 1 is a schematic configuration diagram (refrigerant circuit diagram) of a heat pump type vehicular air conditioning system according to an embodiment of the present invention.

First, the heat pump type vehicular air conditioning system 1 according to the embodiment of the present invention will be described with reference to FIG. 1.

The heat pump type vehicular air conditioning system 1 according to the present embodiment includes a heating ventilation and air conditioning unit (HVAC unit) 2 and a heat pump type refrigerant circuit 3 capable of cooling and heating. The heat pump type vehicular air conditioning system 1 is applied to, for example, a hybrid electric vehicle (PHEV).

The HVAC unit 2 includes a blower 4 that introduces inside air from inside the vehicle cabin or outside air in a switchable manner and pressure-feeds the air to the downstream side, a vehicle-internal evaporator 6 that is disposed on the upstream side of an air flow path 5 connected with the blower 4, a heater core 8 that is disposed on the downstream side of the air flow path 5 and through which a heating medium (brine), such as hot water, can circulate via a heating medium circulation circuit 7, and an air mixing damper 9 that adjusts a ratio of the amount of air flowing through the heater core 8 and the amount of air bypassed to adjust the temperature of temperature controlled air blown into the vehicle cabin.

The HVAC unit 2 is installed in an instrument panel on the vehicle cabin side and is configured to selectively blow the temperature controlled air into the vehicle cabin from a plurality of air outlets opening to the vehicle cabin, for example.

Note that the heating medium circulation circuit 7 for circulating the heating medium, such as hot water, through the heater core 8 is provided with a refrigerant/heating medium heat exchanger 16 on the heat pump type refrigerant circuit 3 side, which will be described later, an exhaust heat recovery device for engine exhaust of the PHEV, exhaust heat from a vehicular drive device, such as a motor and an inverter, and the like, and a heat source device, such as a PTC heater, and is thus configured to effectively utilize various types of heat as a heat source for heating.

The heat pump type refrigerant circuit 3 switchable between a cooling cycle and a heating cycle includes a cooling refrigerant circuit (cooling cycle) 15 that is a closed cycle and in which an electric compressor 10 compressing a refrigerant, a vehicle-external heat exchanger (functioning as a condenser during cooling and as an evaporator during heating) 11, a receiver 12, first pressure reducing means 13 with an on-off valve function, and the vehicle-internal evaporator 6 disposed in the HVAC unit 2 are connected in this order via refrigerant piping 14. The cooling refrigerant circuit 15 may be substantially equivalent to refrigerant circuits used for existing vehicular air conditioning systems applied to engine driven vehicles.

The heat pump type refrigerant circuit 3 is further provided, on discharge piping 14A from the electric compressor 10, with the refrigerant/heating medium heat exchanger 16 that exchanges heat between high-temperature, high-pressure refrigerant gas discharged from the electric compressor 10 and the heating medium circulating through the heater core 8 via the heating medium circulation circuit 7, and a three way switch valve 17 that is disposed downstream of the refrigerant/heating medium heat exchanger 16. The three way switch valve 17 is connected with a heating bypass circuit 18, and the other end of the heating bypass circuit 18 is connected with the receiver 12. This configuration allows the refrigerant condensed at the refrigerant/heating medium heat exchanger 16 to be introduced into the receiver 12 during heating.

A second circuit 20 for heating including second pressure reducing means 19 with an on-off valve function is connected between refrigerant outlet piping 14C of the receiver 12 and a refrigerant outlet side of the vehicle-external heat exchanger 11 during cooling operation (a first end of the vehicle-external heat exchanger 11), and a third circuit 22 for heating including a solenoid valve 21 is connected between a refrigerant inlet side of the vehicle-external heat exchanger 11 during cooling operation (a second end of the vehicle-external heat exchanger 11) and intake piping 14F to the electric compressor 10.

This configuration provides a heating refrigerant circuit (heating cycle) 23 that is a closed cycle and in which the electric compressor 10, the refrigerant/heating medium heat exchanger 16, the three way switch valve 17, the heating bypass circuit 18, the receiver 12, the second circuit 20 including the second pressure reducing means 19 with an on-off valve function, the vehicle-external heat exchanger 11, and the third circuit 22 including the solenoid valve 21 are connected in this order via the discharge piping 14A, refrigerant piping 14B (the heating bypass circuit 18), the refrigerant outlet piping 14C, refrigerant piping 14D (the second circuit 20), refrigerant piping 14E (the third circuit 22), and the intake piping 14F. Note that the vehicle-external heat exchanger 11 is provided with a fan 24 for flowing outside air.

The above-described receiver 12 is a receiver 12 with check values including check valves 25, 26 integrally embedded at two refrigerant inflow ports connected with the heating bypass circuit 18 from the three way switch valve 17 and the refrigerant piping 14 from the vehicle-external heat exchanger 11. An automatic thermal expansion valve with a solenoid valve can be used as the first pressure reducing means 13 with an on-off valve function and the second pressure reducing means 19 with an on-off valve function. The automatic thermal expansion valve with a solenoid valve is disposed on the refrigerant inlet side of the vehicle-internal evaporator 6 and/or the refrigerant inlet side of the vehicle-external heat exchanger 11 functioning as an evaporator and is formed by integrating a solenoid valve and an automatic thermal expansion valve. The solenoid valve has such a configuration that energization of a magnet coil moves a movable core forward and backward in the axial direction, so that a valve body opens and closes an inlet side flow path. The automatic thermal expansion valve is configured to detect the temperature and pressure of the refrigerant in an outlet side refrigerant flow path 55 in which the refrigerant evaporated in the vehicle-internal evaporator 6 or the vehicle-external heat exchanger 11 flows and to adjust the lift of the valve. Note that the solenoid valve and the automatic thermal expansion valve may be configured by serially connecting a standard solenoid valve and automatic thermal expansion valve that are independent of each other.

During operation using one or both of the vehicle-internal evaporator 6 and the vehicle-external heat exchanger 11 functioning as an evaporator, the above-described automatic thermal expansion valve with the solenoid valve opens the solenoid valve and allows the refrigerant adiabatically expanded by the automatic thermal expansion valve to be supplied to the vehicle-internal evaporator 6 or the vehicle-external heat exchanger 11 via the inlet side flow path. With the automatic thermal expansion valve with the solenoid valve, the automatic thermal expansion valve can automatically control the flow rate of the refrigerant so that the degree of superheat of the refrigerant is constant at each of evaporator outlets. Thus, the configuration can be simplified, and the cost can be reduced, in comparison with systems using electronic expansion valves requiring refrigerant pressure detecting means and refrigerant temperature detecting means.

Note that in the embodiment of the present invention, an electronic expansion valve, instead of the automatic thermal expansion valve with the solenoid valve, may be used as the first pressure reducing means 13 with an on-off valve function and the second pressure reducing means 19 with an on-off valve function, and use of an electronic expansion valve is not intended to be excluded.

In the above-described heat pump type vehicular air conditioning system 1, in a cooling mode, the refrigerant compressed by the electric compressor 10 circulates in the cooling refrigerant circuit (cooling cycle) 15 by flowing through the refrigerant/heating medium heat exchanger 16, the three way switch valve 17, the vehicle-external heat exchanger 11 functioning as a condenser, the receiver 12, the first pressure reducing means 13 with an on-off valve function, and the vehicle-internal evaporator 6 in this order and then returning to the electric compressor 10 again, as indicated by the solid arrows.

On the other hand, in a heating mode, the refrigerant compressed by the electric compressor 10 circulates in the heating refrigerant circuit (heating cycle) 23 by flowing through the refrigerant/heating medium heat exchanger 16, the three way switch valve 17, the heating bypass circuit 18, the receiver 12, the second circuit 20 including the second pressure reducing means 19 with an on-off valve function, the vehicle-external heat exchanger 11 functioning as an evaporator, and the third circuit 22 including the solenoid valve 21 in this order and then returning to the electric compressor 10 again, as indicated by the dashed arrows. The heating medium (brine), such as hot water, circulating in the heating medium circulation circuit 7 is heated at the refrigerant/heating medium heat exchanger 16 and then supplied to the heater core 8.

According to the configuration described above, the present embodiment has the following operational effects.

In the cooling mode, the high-temperature, high-pressure refrigerant gas compressed by the electric compressor 10 is guided by the discharge piping 14A through the refrigerant/heating medium heat exchanger 16 and the three way switch valve 17 to the vehicle-external heat exchanger 11 functioning as a condenser, and then condensed and liquefied through heat exchange with outside air flown by the fan 24 in the vehicle-external heat exchanger 11. The liquid refrigerant is introduced into the receiver 12 through the check valve 26 and stored temporarily because the solenoid valve of the automatic thermal expansion valve with the solenoid valve composing the second pressure reducing means 19 is closed, then guided to the first pressure reducing means 13 through the refrigerant outlet piping 14C, pressure-reduced into a gas-liquid two phase state, and supplied to the vehicle-internal evaporator 6.

The refrigerant evaporated in the vehicle-internal evaporator 6 through heat exchange with inside air or outside air blown from the blower 4 is taken into the electric compressor 10 through the intake piping 14F and compressed again. Thereafter, the cycle repeats in a similar manner. The cooling refrigerant circuit 15 is the same as cooling cycles in existing systems used in engine driven vehicles, and those cooling cycles can be used as the cooling refrigerant circuit 15 as they are. The inside air or outside air cooled through heat exchange with the refrigerant while passing through the vehicle-internal evaporator 6 is blown into the vehicle cabin to be used for cooling the vehicle cabin.

Note that in the cooling mode, heat exchange in the refrigerant/heating medium heat exchanger 16 can be suspended by closing the heating medium circulation circuit 7 for circulating the heating medium through the refrigerant/heating medium heat exchanger 16 and the heater core 8.

In the heating mode, the refrigerant compressed by the electric compressor 10 is guided through the discharge piping 14A to the refrigerant/heating medium heat exchanger 16, and then condensed and liquefied through heat exchange with the heating medium circulating in the heating medium circulation circuit 7 to heat the heating medium. The heating medium circulates through the heater core 8 to be used for heating. The refrigerant condensed in the refrigerant/heating medium heat exchanger 16 is introduced into the receiver 12 through the three way switch valve 17 and the heating bypass circuit 18 and stored temporarily, then guided to the second pressure reducing means 19 through the refrigerant outlet piping 14C and the second circuit 20 because the solenoid valve of the automatic thermal expansion valve with the solenoid valve composing the first pressure reducing means 13 is closed, pressure-reduced into a gas-liquid two phase state in the second pressure reducing means 19, and supplied to the vehicle-external heat exchanger 11.

At this time, the refrigerant in the refrigerant piping 14 connecting the vehicle-external heat exchanger 11 with the receiver 12 flows in the forward direction for the check valve 26. However, a pressure difference between the refrigerant piping 14 under a low pressure and the receiver 12 under a high pressure allows the check valve 26 to maintain an off state and thus prevents the refrigerant from flowing from the vehicle-external heat exchanger 11 side through the refrigerant piping 14 to the receiver 12. Thus, the refrigerant supplied to the vehicle-external heat exchanger 11 is subjected to heat exchange with outside air flown by the fan 24 in the vehicle-external heat exchanger 11 functioning as an evaporator, absorbs heat from the outside air and is evaporated, then is taken into the electric compressor 10 through the third circuit 22 including the solenoid valve 21 and the intake piping 14F, and is compressed again. Thereafter, the cycle repeats in a similar manner. The heating refrigerant circuit 23 enables heat pump heating using outside air as a heat source.

In this way, according to the present embodiment, the heat pump type refrigerant circuit 3 is configured by adding the refrigerant/heating medium heat exchanger 16, the three way switch valve 17, the heating bypass circuit 18, the second circuit 20 including the second pressure reducing means 19, and the third circuit 22 including the solenoid valve 21, to the cooling refrigerant circuit 15 substantially equivalent to cooling refrigerant circuits of existing systems; and the HVAC unit 2 is used that is similar to HVAC units of existing systems and is provided with the vehicle-internal evaporator 6 on the upstream side and the heater core 8, capable of circulating the brine, such as hot water, on the downstream side. This configuration enables two heat exchangers including the vehicle-internal evaporator 6 and the vehicle-external heat exchanger 11 (functioning as a condenser) to function in the cooling mode and enables two heat exchangers including the refrigerant/heating medium heat exchanger 16 and the vehicle-external heat exchanger 11 (functioning as an evaporator) to function in the heating mode, thereby conducting cooling operation and heating operation.

Thus, efficient cooling operation and heating operation are conducted with maximum performance appropriate for the workload of the electric compressor 10, resulting in enhancement in cooling and heating capability, and the heat pump type vehicular air conditioning system 1 can be configured by adding minimum heating devices, resulting in simplification of the configuration and reduction in size and cost.

Since an HVAC unit equivalent to those of existing systems, in which the heater core 8 for circulating the heating medium including hot water therethrough is disposed downstream of the vehicle-internal evaporator 6, can be used as the HVAC unit 2, various heat sources can be utilized for heating, for example, by collecting exhaust heat from a vehicular drive device, such as an engine, a motor, and an inverter, with the heating medium or by heating the heating medium with a PTC heater or the like to use the heating medium as a heat source for heating. Since the refrigerant/heating medium heat exchanger 16 is disposed on the discharge piping 14A of the electric compressor 10 and the three way switch valve 17 is disposed downstream of the refrigerant/heating medium heat exchanger 16, the three way switch valve 17 can be installed on a CRFM 27 side, resulting in enhancement in vehicle mountability.

Since the receiver 12 embedded in the above-described heat pump type vehicular air conditioning system 1 is a receiver 12 with check valves including the check valves 25, 26 embedded at the refrigerant inflow ports, the cooling or heating refrigerant circuit 15, 23 not used depending on the operation mode is blocked by the check valve 25, 26 embedded at the refrigerant inflow port of the receiver 12 to prevent a backflow of the refrigerant to the refrigerant circuit 15, 23. This prevents the refrigerant from flowing to the unused refrigerant circuit 15, 23 and reduces components for connection to a flange or the like in comparison with a heat pump type refrigerant circuit 3 provided with a receiver 12 and check valves 25, 26 separately, resulting in simplification of the heat pump type refrigerant circuit 3 and reduction in cost.

Thus, the first pressure reducing means 13 and the second pressure reducing means 19 can be used in a switchable manner with their on-off valve functions depending on the operation mode, and operation using both the vehicle-external heat exchanger 11 and the vehicle-internal evaporator 6 can be conducted in the heating mode.

Figure 2:
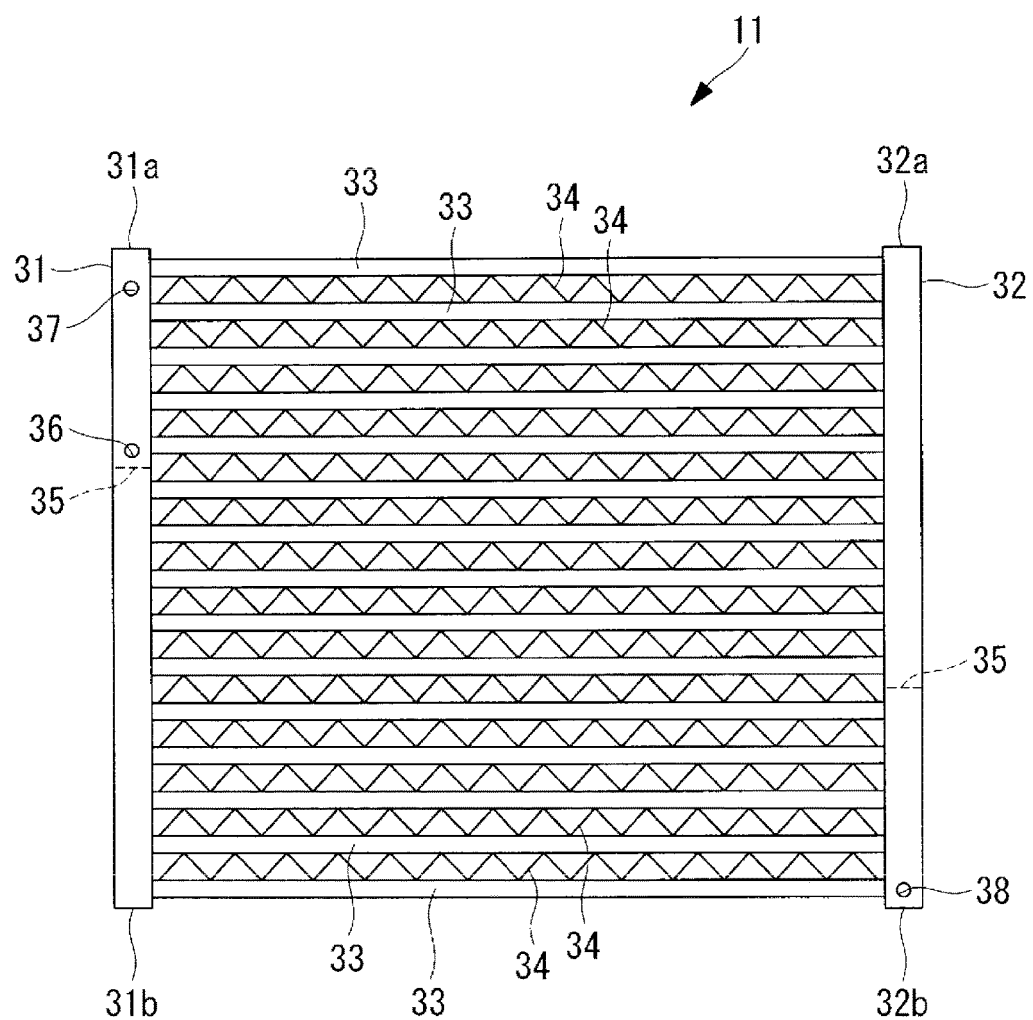
FIG. 2 is a front view of a heat exchanger of the heat pump type vehicular air conditioning system according to the embodiment of the present invention.
Figure 3:
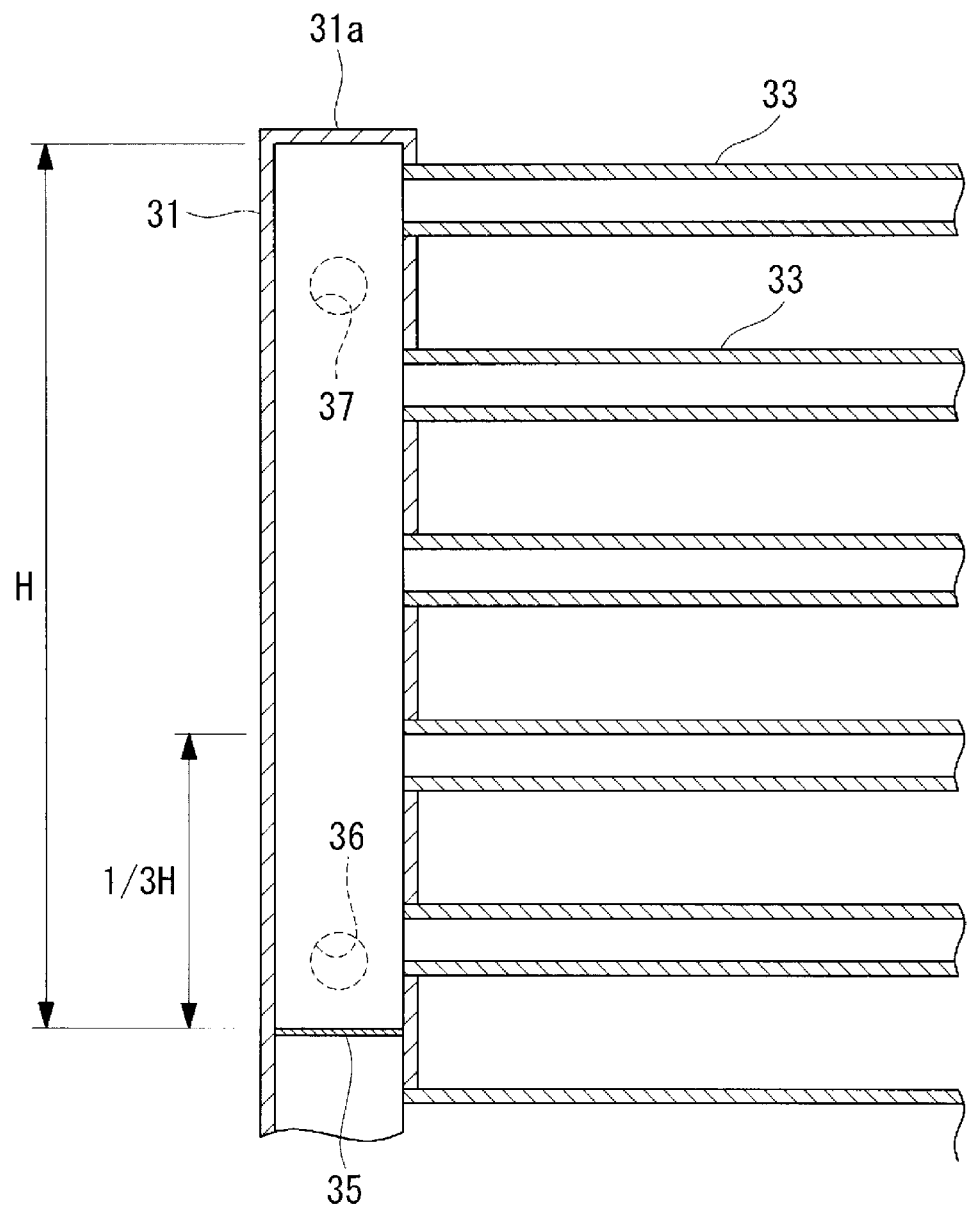
FIG. 3 is a partially enlarged front view of the heat exchanger of the heat pump type vehicular air conditioning system according to the embodiment of the present invention.
Figure 4:
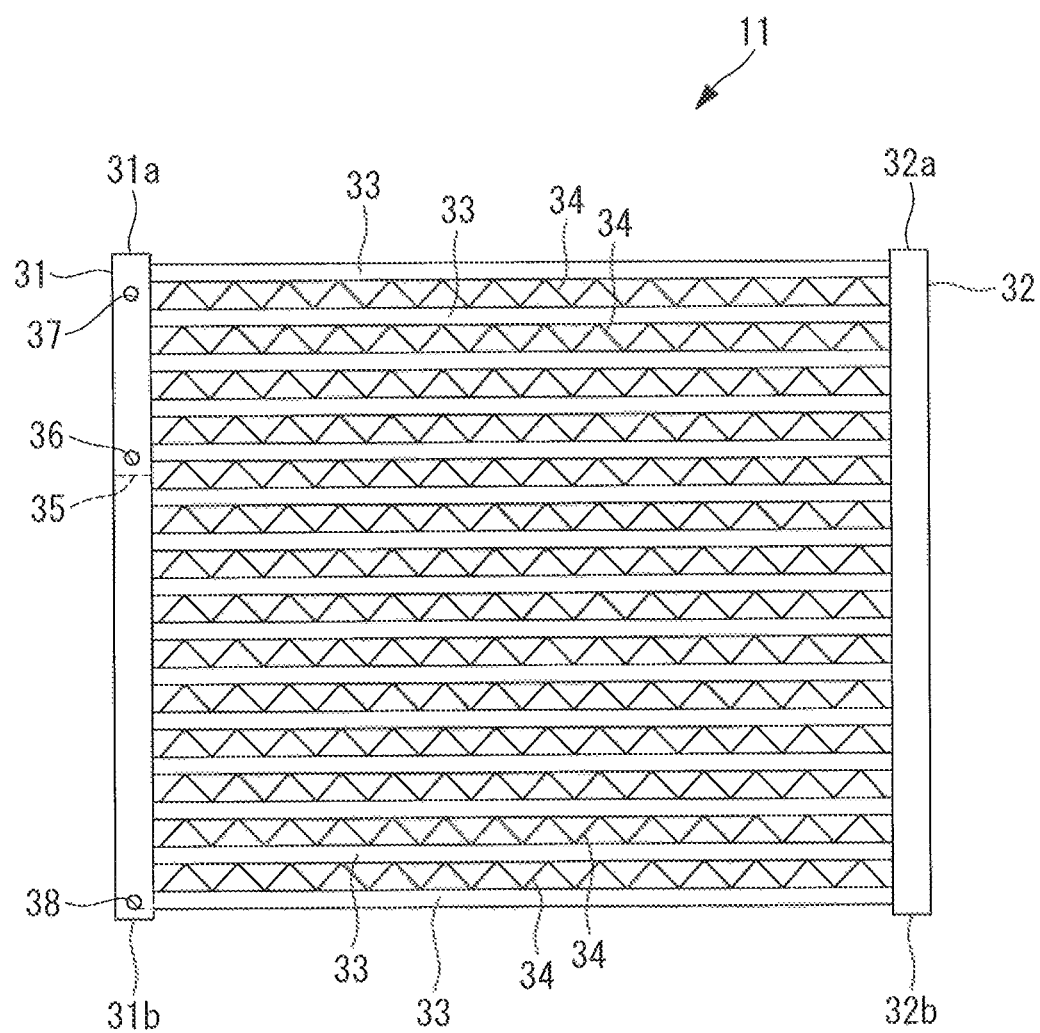
FIG. 4 is a front view of a heat exchanger of the heat pump type vehicular air conditioning system according to the embodiment of the present invention.

The vehicle-external heat exchanger 11 applied to the heat pump type vehicular air conditioning system 1 according to the present embodiment will be described below with reference to FIGS. 2 and 3.

The vehicle-external heat exchanger 11 according to the present embodiment is a so-called multi-flow type heat exchanger, and includes tubes 33 and fins 34 disposed between two headers 31, 32. The refrigerant flowing into a first header 31 branches and flows into the tubes 33, and the refrigerant branching and flowing into the tubes 33 joins in a second header 32.

The vehicle-external heat exchanger 11 has two sides where the two headers 31, 32 face each other and has a substantially planar shape. Air is supplied from a first surface side of the vehicle-external heat exchanger 11 and discharged from a second surface side being the back side of the first surface. When air passes through the vehicle-external heat exchanger 11, heat exchange is performed with the refrigerant flowing in the tubes 33.

The vehicle-external heat exchanger 11 is applied to, for example, the above-described refrigerant circuits of the heat pump system and functions as a condenser during cooling operation and as an evaporator during heating operation. That is, when the vehicle-external heat exchanger 11 functions as a condenser, heat of the refrigerant flowing into the vehicle-external heat exchanger 11 is discharged to the outside to cool the refrigerant. At this time, the refrigerant in a gas state flows into the vehicle-external heat exchanger 11 and is liquefied in the vehicle-external heat exchanger 11.

On the other hand, when the vehicle-external heat exchanger 11 functions as an evaporator, the refrigerant flowing into the vehicle-external heat exchanger 11 absorbs heat of the outside and is thus heated. At this time, the refrigerant in a gas-liquid two phase state passing through the second pressure reducing means 19 flows into the vehicle-external heat exchanger 11 and is vaporized in the vehicle-external heat exchanger 11.

The vehicle-external heat exchanger 11 is composed of the two headers 31, 32 extending in the vertical direction, the tubes 33 disposed between the two headers 31, 32, the fins 34 each disposed between two tubes 33 in a contacting manner, and the like.

The headers 31, 32, the tubes 33, and the fins 34 are made from, for example, alloy, such as aluminum alloy, aluminum, or other metal.

The headers 31, 32 each have a hollow tubular shape, and the tubes 33 are fixed to the headers 31, 32 at substantially equal intervals in the vertical direction. The interiors of the headers 31, 32 and the interiors of the tubes 33 communicate with each other, and the refrigerant flows through the interiors of the headers 31, 32 and the tubes 33.

The two headers 31, 32 include the first header 31 and the second header 32, respectively. If one partition plate is disposed in each of the first header 31 and the second header 32, the refrigerant flows in the vehicle-external heat exchanger 11 from the first header 31 to the second header 32, then from the second header 32 to the first header 31, and then from the first header 31 to the second header 32 in a turning back manner.

The first header 31 is on the inlet side for the refrigerant to flow in when the vehicle-external heat exchanger 11 functions as a condenser and is on the outlet side for the refrigerant to flow out when the vehicle-external heat exchanger 11 functions as an evaporator. The second header 32 is on the outlet side for the refrigerant to flow out when the vehicle-external heat exchanger 11 functions as a condenser and is on the inlet side for the refrigerant to flow in when the vehicle-external heat exchanger 11 functions as an evaporator.

The tubes 33 each have a flat shape, and a plurality of flow channels extending in the longitudinal direction of the tube 33 are formed in the tube 33. The plurality of flow channels are arranged parallel with each other in the width direction of the tube 33. The tube 33 has a first end connected with the first header 31 and a second end connected with the second header 32.

The fins 34 are formed by arranging a plurality of thin plates, and gaps are provided between the thin plates so that air can flow from the first surface to the second surface of the vehicle-external heat exchanger 11. The fins 34 come into contact with the tubes 33 at the upper and lower portions, so that heat of the refrigerant flowing in the tubes 33 is transmitted.

In the multi-flow type vehicle-external heat exchanger 11 according to the present embodiment when functioning as a condenser, the refrigerant flowing in from openings of the first header 31 flows downward from above in the first header 31 and flows into the flow channels of the tubes 33 connected with the first header 31. The refrigerant flowing into the flow channels of the tubes 33 flows toward the second header 32 and flows into the second header 32. The refrigerant flowing into the second header 32 flows downward from above and flows out from an opening of the second header 32.

Next, the headers 31, 32 of the vehicle-external heat exchanger 11 according to the present embodiment will be described in detail.

As described above, the headers 31, 32 may or may not be provided with partition plates 35 therein. If no partition plate is provided, the headers 31, 32 communicate with all the tubes 33 connected with the headers 31, 32. Thus, the refrigerant flowing into the headers 31, 32 is difficult to efficiently flow but can flow into all the tubes 33.

If one partition plate is provided in each of the first header 31 and the second header 32, the interior of the header 31, 32 is divided into a section between an uppermost surface 31a, 32a of the header 31, 32 and the partition plate 35 and a section between the partition plate 35 and a lowermost surface 31b, 32b of the header 31, 32, respectively. The interiors of the divided sections of the headers 31, 32 communicate with the tubes 33 connected with the respective divided sections. Thus, the refrigerant flowing into the divided sections of the headers 31, 32 flows into the tubes 33 connected with the respective divided sections. This configuration allows the refrigerant to flow in the vehicle-external heat exchanger 11 from the first header 31 to the second header 32, then from the second header 32 to the first header 31, and then from the first header 31 to the second header 32 in a turning back manner.

Note that two or more partition plates 35 may be provided in one of the headers 31, 32, so that a divided section is defined between adjacent partition plates 35. In this case, the refrigerant flows back and forth in the vehicle-external heat exchanger 11 twice or more. Alternatively, the partition plate 35 may be provided only in the first header 31 and not in the second header 32. In this case, the refrigerant flows back and forth in the vehicle-external heat exchanger 11 only once.

Next, openings 36, 37, 38 provided in the first header 31 and the second header 32, that is, refrigerant inlets and refrigerant outlets will be described.

The first header 31 is provided with a first opening 36 formed in a lower position in the total height of the divided section defined between the uppermost surface 31a of the first header 31 and the partition plate 35. For example, the first opening 36 is desirably provided in the vicinity of the partition plate 35 and may be provided between the partition plate 35 and a position at a height of about ⅓ of the total height of the divided section from the partition plate 35.

The first opening 36 serves as the refrigerant outlet for the refrigerant to flow out when the vehicle-external heat exchanger 11 functions as an evaporator.

The first header 31 is further provided with a second opening 37 formed in a position higher than the first opening 36 in the divided section defined between the uppermost surface of the first header 31 and the partition plate 35.

The second opening 37 serves as the refrigerant inlet for the refrigerant to flow in when the vehicle-external heat exchanger 11 functions as a condenser.

Since the first opening 36 and the second opening 37 are provided separately in the first header 31, piping work in connecting piping with the vehicle-external heat exchanger 11 is easier than the case in which a common opening is provided and piping is branched.

The second header 32 is provided with a third opening 38 in the vicinity of the lowermost surface of the second header 32.

The third opening 38 serves as the refrigerant outlet for the refrigerant to flow out when the vehicle-external heat exchanger 11 functions as a condenser and the refrigerant inlet for the refrigerant to flow in when the vehicle-external heat exchanger 11 functions as an evaporator.

When the vehicle-external heat exchanger 11 functions as an evaporator, the refrigerant flows in from the third opening 38 and flows upward from the lower portion of the vehicle-external heat exchanger 11. This allows the liquefied refrigerant to always remain accumulated in the lower portion of the vehicle-external heat exchanger 11 and can thus prevent an increase in pressure loss in the vehicle-external heat exchanger 11 in comparison with the case in which the refrigerant flows downward from above.

The first opening 36 serving as the refrigerant outlet for the refrigerant to flow out is formed in a lower position in the divided section of the first header 31. Thus, if the refrigerant reaching the outlet of the vehicle-external heat exchanger 11 is not gasified partially with the vehicle-external heat exchanger 11 functioning as an evaporator, the liquid refrigerant can be discharged through the first opening 36 to the outside at the height of the first opening 36. The amount of the liquid refrigerant accumulating in the first header 31 can be reduced.

Even if the refrigerant is liquefied in the vicinity of the second opening 37 positioned higher than the first opening 36 or in piping connected with the second opening 37 with the vehicle-external heat exchanger 11 functioning as an evaporator, the refrigerant can flow out from the first opening 36 formed in a lower position in the divided section of the first header 31.

As described above, in the vehicle-external heat exchanger 11 achieving both an evaporator function and a condenser function, the first opening 36 serving as the refrigerant outlet for the refrigerant to flow out when the vehicle-external heat exchanger 11 functions as an evaporator is formed separately from the second opening 37 for the refrigerant to flow in when the vehicle-external heat exchanger 11 functions as a condenser.

The first opening 36 is formed in a position lower than the second opening 37 and in a lower position in the divided section of the first header 31. In vehicle-external heat exchangers 11 of the related art achieving both an evaporator function and a condenser function, a refrigerant outlet when the vehicle-external heat exchanger 11 functions as an evaporator and a refrigerant inlet when the vehicle-external heat exchanger 11 functions as a condenser are formed in the uppermost position of a header. In this case, surplus refrigerant accumulates up to a position reaching the uppermost position of the header of the vehicle-external heat exchanger 11. This causes a problem in that the amount of the surplus refrigerant is increased. However, according to the present embodiment, the amount of surplus liquid refrigerant accumulating in the first header 31 can be reduced.

In vehicle-external heat exchanger 11 of the related art achieving both an evaporator function and a condenser function, a refrigerant outlet when the vehicle-external heat exchanger 11 functions as an evaporator and a refrigerant inlet when the vehicle-external heat exchanger 11 functions as a condenser are formed at the same height, or only one opening is provided to be used commonly as an outlet and an inlet. In this case, when the vehicle-external heat exchanger 11 functions as an evaporator, the refrigerant liquefied at the refrigerant inlet used when the vehicle-external heat exchanger 11 functions as a condenser or in piping connected to the refrigerant inlet for a condenser is not discharged until the liquid refrigerant reaches the same height as the refrigerant outlet or is not discharged from the vehicle-external heat exchanger 11 at all. In the present embodiment, the first opening 36 is formed in a position lower than the second opening 37 and in a lower position in the divided section of the first header 31. Thus, even if the refrigerant is liquefied in the vicinity of the second opening 37 or in piping connected with the second opening 37, the refrigerant can flow out from the first opening 36.

REFERENCE SIGNS LIST

1 Heat pump type vehicular air conditioning system
2 HVAC unit
3 Heat pump type refrigerant circuit
6 Vehicle-internal evaporator
7 Heating medium circulation circuit
8 Heater core
10 Electric compressor
11 Vehicle-external heat exchanger
12 Receiver (Receiver with check valve)
13 First pressure reducing means
14A Discharge piping
14F Intake piping
15 Cooling refrigerant circuit (Cooling cycle)
16 Refrigerant/heating medium heat exchanger
17 Three way switch valve
18 Heating bypass circuit
19 Second pressure reducing means
20 Second circuit
21 Solenoid valve
22 Third circuit
23 Heating refrigerant circuit (Heating cycle)
31 Header, First header
32 Header, Second header
33 Tube
34 Fin
35 Partition plate
36 Opening, First opening
37 Opening, Second opening
38 Opening, Third opening

The invention claimed is:

1. A heat exchanger comprising:
a hollow first header;
a hollow second header provided facing the first header; and
a plurality of tubes disposed between the first header and the second header and communicating with the first header and the second header;
the first header being provided with a partition plate dividing an interior of the first header;
the first header being provided with a first opening on a partition plate side in a divided section defined between an upper end of the first header and the partition plate;
the first header being provided with a second opening formed on an upper end side of the first header with respect to the first opening in the divided section;
with the heat exchanger functioning as an evaporator, a refrigerant being supplied from a lower part of the first header or of the second header, and the first opening serving as an outflow port for the refrigerant; and
with the heat exchanger functioning as a condenser, the refrigerant being supplied from the second opening and flows to the lower part of the first header or of the second header.

2. A heat pump system comprising:
the heat exchanger according to claim 1;
a first circuit connected with the heat exchanger, a refrigerant flowing through the first circuit with the heat exchanger functioning as an evaporator; and
a second circuit connected with the heat exchanger, the refrigerant flowing through the second circuit with the heat exchanger functioning as a condenser.

3. The heat pump system according to claim 2 comprising:
the heat exchanger;
the first circuit; and
the second circuit;
the heat pump system being applied as a vehicular air conditioning system.

* * * * *